Aug. 21, 1928.  A. H. LIGHT  1,681,488
PISTON STRUCTURE
Filed July 20, 1926   3 Sheets-Sheet 1

INVENTOR.
Arthur H. Light
BY
Townsend, Loftus & Abbett
ATTORNEYS.

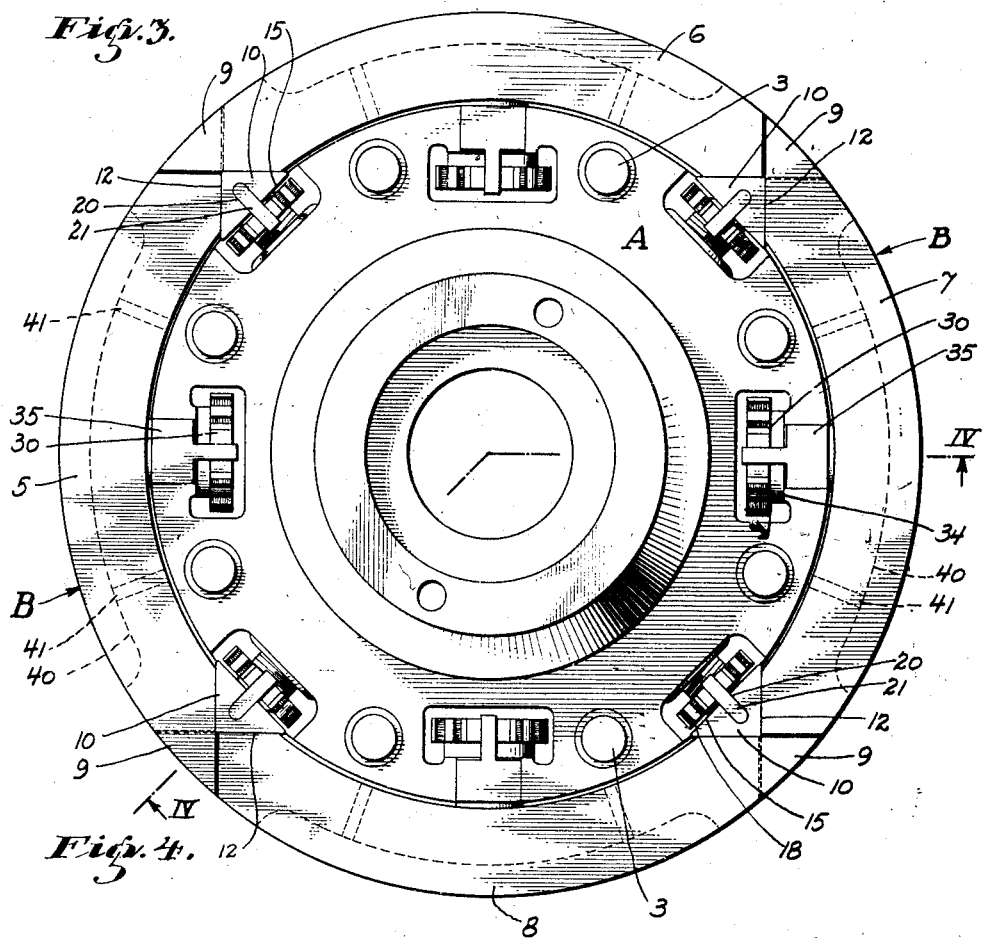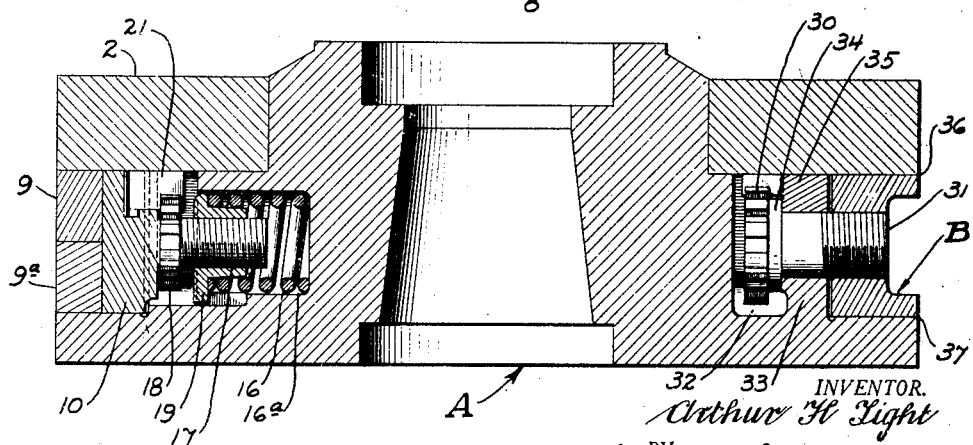

Aug. 21, 1928.
A. H. LIGHT
1,681,488
PISTON STRUCTURE
Filed July 20, 1926   3 Sheets-Sheet 3
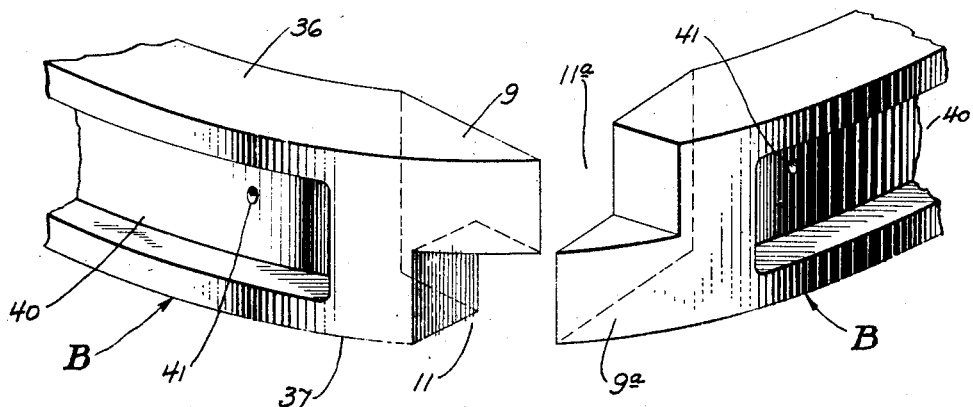
Fig. 5.
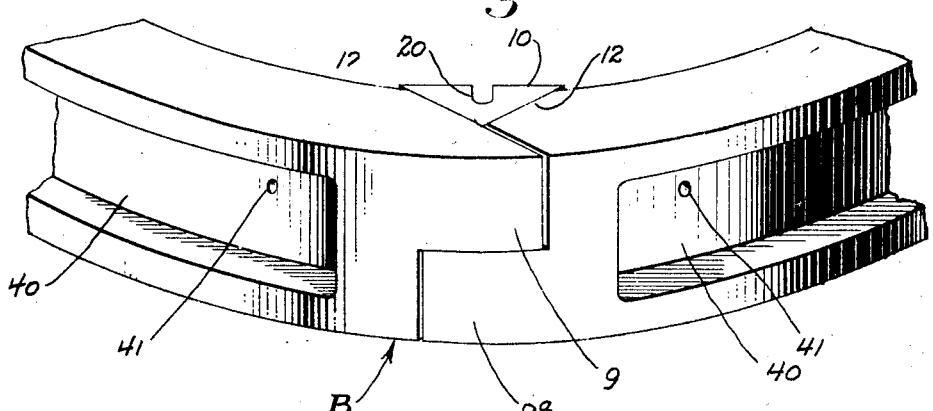
Fig. 6.
Fig. 7.
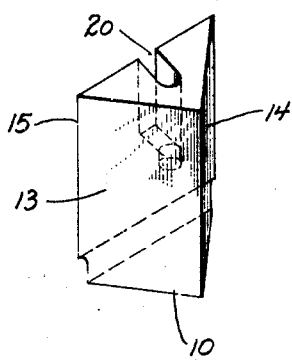
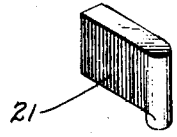
Fig. 8.
INVENTOR.
Arthur H. Light
BY
Townsend, Loftus & Abbett
ATTORNEYS.

Patented Aug. 21, 1928.

1,681,488

UNITED STATES PATENT OFFICE.

ARTHUR H. LIGHT, OF OAKLAND, CALIFORNIA.

PISTON STRUCTURE.

Application filed July 20, 1926. Serial No. 123,634.

This invention relates to a piston and especially to a piston ring structure and assembly thereof.

The object of the present invention is to generally improve and simplify the construction and operation of pistons and particularly the piston ring carried thereby; to provide a ring which consists of a plurality of segments; to provide means whereby radial movement of each segment is permitted and whereby the radial movement may be restricted and adjusted; to provide other means whereby the segments may be automatically advanced as wear takes place; to provide means whereby excessive pressure and wear between the ring segments and the cylinder surface may be substantially reduced and further to provide sealing members whereby steam or fluid leakage between the segment joints will be practically eliminated.

Figure 1:
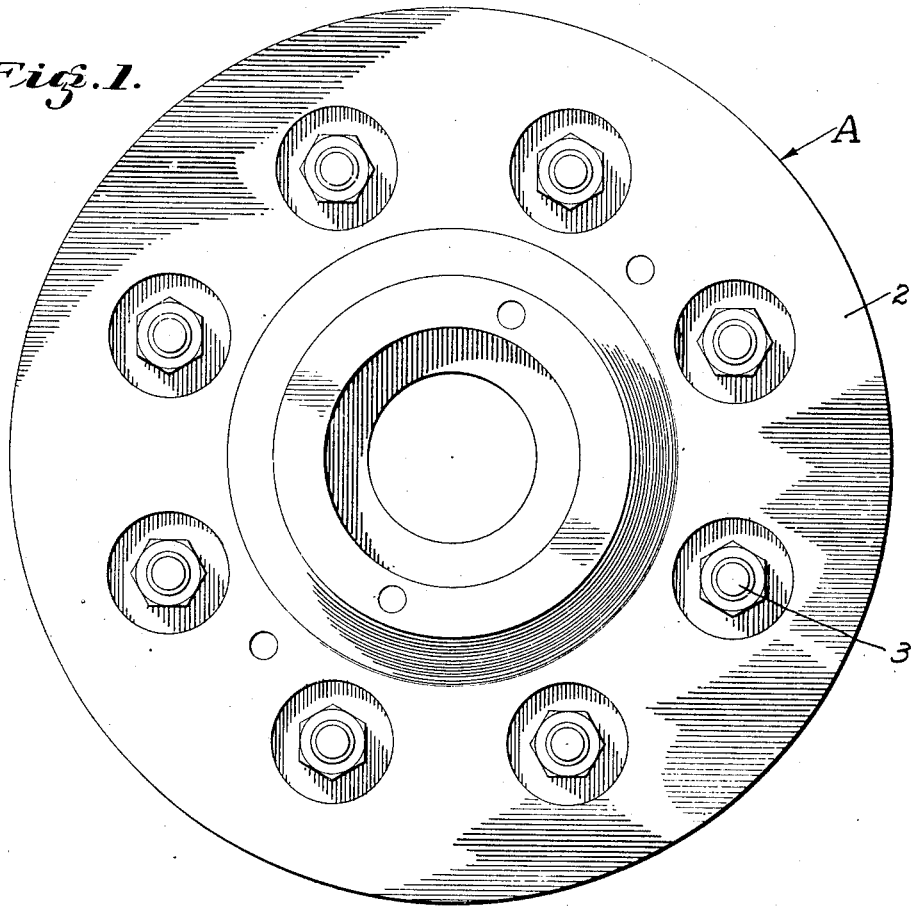
Figure 2:
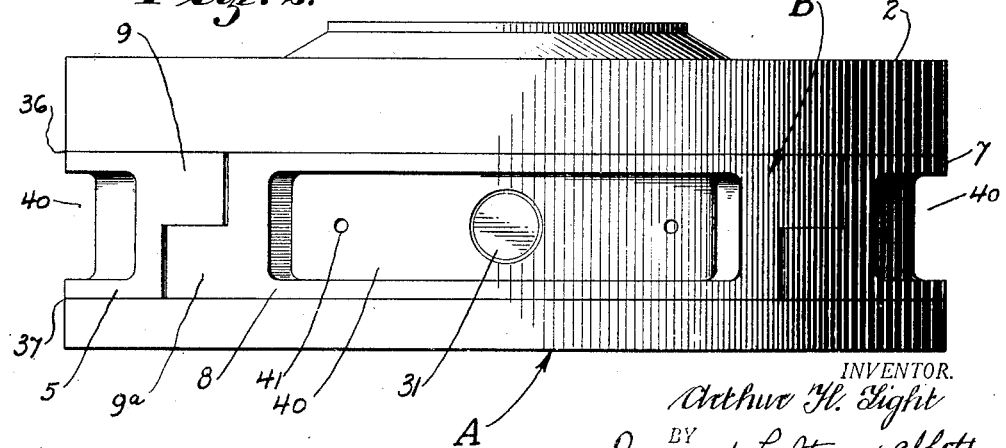

One form which the invention may assume is shown by way of illustration in the accompanying drawings, in which:

Figure 1 is a plan view of the piston,
Figure 2 is a side elevation of the same,
Figure 3 is a plan view of the piston showing the follower head removed,
Figure 4 is a cross section of the piston taken on the line IV—IV of Figure 3,
Figure 5 is a perspective view of two segment sections showing the ends or joints,
Figure 6 is a similar view showing two piston sections assembled and also showing a sealing block cooperating therewith,
Figure 7 is a perspective view of this sealing block,
Figure 8 is a perspective view of the lock used in conjunction with the sealing block and an adjusting screw co-operating therewith.

Referring to the drawings in detail and particularly Figures 1, 2, 3 and 4, A indicates in general the body of the piston, 2 the follower head and 3 a series of bolts whereby the follower head is secured with relation to the body of the piston. Formed intermediate the follower head and the lower portion of the piston and in the periphery thereof is an annular groove which is provided for the reception of a ring generally indicated at B. This ring consists of a plurality of sections such as shown at 5, 6, 7 and 8. More or less of these sections may be employed as the piston diameter is increased or decreased.

Means are employed for maintaining a substantial steam or fluid tight joint between the piston ring sections and means are also employed for restricting radial outward movement of the segments with relation to the piston and the cylinder in which the piston operates. This is accomplished as follows:—

By referring to Figures 3, 4, 5 and 6, it will be noted that the piston ring segments are provided with overlapping sections generally indicated at 9 and that a sealing block 10 co-operates with each segment joint. There are four segments employed in the present instance and also four sealing blocks. The sealing blocks perform two functions, first that of forming a steam tight joint between the overlapping sections of the segments and secondly that of forcing the segments outwardly into contact with the cylinder surface.

The construction which permits overlapping of the ring segments is perhaps best illustrated in Figures 5 and 6. The ends of the segments are cut on an angle of 45° with relation to a radial line drawn from the center of the piston. A portion of each segment is cut away as indicated at 11 on the lower side and the opposite end of each segment is cut away as indicated at 11ª on the upper side, thus forming an overlapping section 9 which fits the cutaway portion 11ª and an underlying section 9ª which fits the cutaway section 11.

A step or offset joint is thus formed between each segment and a V-shaped pocket 12 is formed on the rear side of each joint. This pocket is provided for the reception of the sealing block 10. The sealing block is best shown in Figures 3, 4, 6 and 7. It is provided with two forward faces 13 and 14 disposed at angles of 45° with relation to a radial line and a flat rear face 15. The faces 13 and 14 engage at 45° angular end faces of the segments or the V-shaped pocket 12 formed thereby when two segments join each other as shown in Figure 6 and a steam tight joint is thus formed between the segment joints or ends as the sealing block is maintained in contact therewith by means of a spring 16.

There are, as previously stated, four segments, four sealing blocks and four springs and as they are all identical, it is believed that the description of one will suffice. The spring 16 is held and guided in a pocket 16ª formed in the piston body. A screw 17 provided with a castellated head 18 is interposed between the rear surface 15 of the sealing block and the spring 17, and the screw carries a nut 19 which engages the spring. By turning the castellated head 18 and screw 17, the spring 16ª may be compressed to any tension desired. This pressure is exerted on the sealing block and the segments and will cause them to be held in working position with relation to the surface of the cylinder in which the piston is operated. The upper end of the sealing block is vertically grooved as shown at 20 to receive a key or locking member 21 (see Figures 7 and 8). One end of the key is inserted in the groove 20 while the opposite end of the key projects inwardly and engages the castellated head 18, thus locking the same against rotation after proper adjustment and spring tension has been obtained. The sealing blocks serve two functions, first that of sealing the joints between the piston ring sections and secondly that of forcing them radially and outwardly into working position.

Means are, however, provided for limiting the outward movement. This is accomplished by providing a series of limiting or restricting screws. There is one restricting screw for each segment and as they are all identical in construction, the description of one should suffice. The restricting screws are best shown in Figures 3 and 4. They consist of a castellated head 30 and a screw or bolt section 31 which engages the internally threaded section of each segment.

A pocket 32 and a forked lug 33 is formed for the reception of the restricting screw and head 30. A copper or soft metal washer 34 is interposed between the lug 33 and the head 30 and the function thereof will hereinafter be described. A key or locking member 35, similar to that illustrated in Figure 8, is also employed in conjunction with the restricting screw and accidental rotation, after adjustment has been made, is thus prevented. The locking key is dropped downwardly through the center portion of each forked lug 33 and the inner end projects and enters through the castellation of the head 30, thereby locking the same against rotation. When the follower head 2 is removed and the keys 35 and 21 are lifted out of engagement with the respective castellated heads 18 and 30, it is possible to adjust the spring tension exerted against the sealing blocks 10 and the several segments and it is also possible to adjust the restricting screws to limit the outward radial movement of the respective segments. When the proper adjustment has been made the locking keys are replaced and similarly the follower head. This head engages the upper end of the locking keys and thus positively retains them against removal and the respective adjusting screws against rotation.

The follower head furthermore engages the upper faces of the segments and simultaneously forces the lower faces of the segments into contact with the piston flange thereby rendering the upper and lower faces of the segments indicated at 36 and 37 (see Figure 4) substantially steam tight. Care must, however, be taken that the follower head is not too tightly applied as the segments would then be locked against radial movement. In other words, it is only necessary to see that a steam tight joint is maintained and that the segments be permitted to move outwardly under spring tension.

The restricting screws are applied to the center portions of the segments and this is important as it provides uniform movement for each segment when adjusting the same, that is, both ends of each segment will have the same amount of movement and thus individual adjustment of the end of the segments is eliminated. It should further be noted that the spring pressure is applied to the opposite ends of each segment and that this further insures uniform contact of the segments with relation to the cylinder throughout their entire surfaces.

In actual practice where a piston of this character is employed in conjunction with a steam engine cylinder, it is found that a certain amount of steam will leak around the ring and such will build up a pressure behind the rings substantially equal to the steam pressure in the cylinder. Such pressure unless counter-balanced would project the ring segments against the cylinder surface with such a pressure that excessive wear would take place. This is overcome in the present instance by forming pockets 40 in the exterior faces of the ring sections and by connecting said pockets with the inner sides of the segments through ports or drilled holes, such as indicated at 41. Any pressure built up on the inner side of the ring segments is thus communicated to the exterior surface as well and the steam pressure is thus substantially counter-balanced, and the strain on the restricting screws proportionately reduced.

It is previously stated that the restricting screws were provided for the purpose of limiting the radial outward movement of the respective segments. It was, however, stated that soft metal or copper washers 34 were interposed between the forked lugs 33 and nuts 30. The inter-position of these washers is of considerable importance as it permits automatic projection or advance of the individual ring segments as wear takes place between the segments and the cylinder surface.

In actual practice it is known that the piston body and the follower head is usually of smaller diameter than the diameter of the cylinder in which they operate. This diameter increases with wear and there is, accordingly a certain amount of wobbling or radial movement of the piston with relation to the cylinder. Such movement forces the individual segments inwardly and outwardly within the grooves during each reciprocal movement of the piston and the washer 34 are thus subjected to alternate compression and belief, or in other words, what is commonly known as a hammering action. This hammering action although very slight causes a gradual compression of the copper gaskets and it is due to this gradual compression that the ring segments are gradually advanced as wear takes place.

This gradual compression of the copper washers is, however, not sufficient to take up all the wear during the entire lift of the ring segments, but it does relieve the engineer of the necessity of removing the pistons to readjust the segments as often as would, otherwise, be the case. It is, accordingly, necessary from time to time to remove the follower head and the locking keys 21 and 35 to readjust the restricting screws and springs so the segments can be further advanced as wear takes place. This is not only an essential feature, but it is also a desirable feature, as it permits the individual segments to be projected from time to time as wear takes place, and it furthermore permits the segments to be excessively worn before renewal is necessary.

While certain features of the present invention are more or less specifically described, I wish it understood that various changes may be resorted to, from time to time, that come within the scope of the appended claims.

Similarly that various materials and finishes of the several parts employed may be such as the manufacture may decide or varying conditions or uses may demand. The piston herein disclosed is particularly designed for steam engine use, but it may be obviously applied to hydraulic presses, pumps, internal combustion engine cylinders, etc.

Having thus described my invention, what I claim and desire to secure by Letters Patent is:—

1. A piston of the character described having an annular groove formed in its peripheral surface, a ring consisting of a plurality of segments mounted in the groove, means engageable with each segment to force the segments outwardly in a radial direction, and an adjustable member connected with each segment and adapted to limit the outward radial movement of the segments.

2. A piston of the character described having an annular groove formed in its peripheral surface, a ring consisting of a plurality of segments mounted in the groove, means engageable with each segment to force the segments outwardly in a radial direction, a plurality of turnable screws mounted in the piston, one for each segment, said screws being secured against longitudinal movement, a threaded engagement formed between each screw and adjacent segment, and said screws when turned causing radial adjustment of the individual segments and limiting their outward movement, and means for locking the screws against turning.

3. A piston of the character described having an annular groove formed in its peripheral surface, a ring consisting of a plurality of segments mounted in the groove, means engageable with each segment to force the segments outwardly in a radial direction, a plurality of lugs on the piston, one behind each segment, a screw carried by each lug and turnable therein but secured against longitudinal movement, and each screw having threaded engagement with an adjacent segment and adapted to adjust and limit radial outward movement of each segment, a head on each screw and a soft metal washer interposed between each head and lug.

4. A piston of the character described having an annular groove formed in its peripheral surface, a ring consisting of a plurality of overlapping segments, mounted in the groove, said segments, at their overlapping ends, having V-shaped pockets formed on the rear sides, a V-shaped sealing block adapted to be received by each pocket, a spring engageable with each block to force the blocks and the segments outwardly in a radial direction and to form a seal between the overlapping ends of the segments, a plurality of lugs on the piston, one behind each segment, a screw carried by each lug and turnable therein but secured against longitudinal movement, and each screw having a threaded engagement with an adjacent segment and adapted to adjust and limit radial outward movement of the segments, and means whereby said screws may be secured against turning movement.

5. A piston of the character described having an annular groove formed in its peripheral surface, a ring consisting of a plurality of overlapping segments, mounted in the groove, said segments, at their overlapping ends, having V-shaped pockets formed on the rear sides, a V-shaped sealing block adapted to be received by each pocket, a spring engageable with each block to force the blocks and the segments outwardly in a radial direction and to form a seal between the overlapping ends of the segments, a plurality of lugs on the piston, one behind each segment, a screw carried by each lug and turnable therein but secured against longitudinal movement and each screw having a threaded engagement with an adjacent segment and adapted to adjust and limit radial outward movement of the segments, a head on each screw, a soft metal washer interposed between each head and lug, and means securing the heads and connected screws against turning movement.

ARTHUR H. LIGHT